United States Patent
Mochida et al.

(10) Patent No.: US 11,780,503 B2
(45) Date of Patent: Oct. 10, 2023

(54) VEHICLE CONTROLLER

(71) Applicant: TOYOTA JIDOSHA KABUSHIKI KAISHA, Toyota (JP)

(72) Inventors: Tsutomu Mochida, Sunto-gun (JP); Motokatsu Tomozawa, Susono (JP); Masaya Kato, Toyokawa (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 456 days.

(21) Appl. No.: 16/284,058

(22) Filed: Feb. 25, 2019

(65) Prior Publication Data

US 2019/0300054 A1 Oct. 3, 2019

(30) Foreign Application Priority Data

Mar. 27, 2018 (JP) ................. 2018-059684

(51) Int. Cl.
| | | |
|---|---|---|
| *B62D 15/02* | (2006.01) | |
| *G05D 1/02* | (2020.01) | |
| *G06V 20/58* | (2022.01) | |
| *B60W 30/06* | (2006.01) | |

(52) U.S. Cl.
CPC ....... *B62D 15/0285* (2013.01); *G05D 1/0212* (2013.01); *G06V 20/58* (2022.01); *G06V 20/586* (2022.01); *G05D 2201/0213* (2013.01)

(58) Field of Classification Search
CPC ............. B62D 15/0285; G05D 1/0212; G05D 2201/0213; G06K 9/00805; G06K 9/00812
See application file for complete search history.

(56) References Cited

U.S. PATENT DOCUMENTS

| | | | | |
|---|---|---|---|---|
| 2009/0123028 A1* | 5/2009 | Satonaka | .............. | G01S 13/931 |
| | | | | 382/103 |
| 2011/0093168 A1* | 4/2011 | Barth | ....................... | G08G 1/16 |
| | | | | 701/41 |
| 2018/0156632 A1 | 6/2018 | Jung et al. | | |

FOREIGN PATENT DOCUMENTS

| | | | | |
|---|---|---|---|---|
| CN | 101044048 A | | 9/2007 | |
| CN | 102066187 A | | 5/2011 | |
| JP | 2004-352110 A | | 12/2004 | |
| JP | 2016060218 A | * | 4/2016 | ........... B62D 15/025 |
| JP | 2018-34659 A | | 3/2018 | |

\* cited by examiner

*Primary Examiner* — Aniss Chad
*Assistant Examiner* — Madison R Hughes
(74) *Attorney, Agent, or Firm* — Sughrue Mion, PLLC (57) ABSTRACT

A vehicle controller includes a target position recognition unit configured to recognize a target position, a parking route generation unit configured to generate a parking route, and an automatic steering unit configured to automatically operate a steering device. The parking route generation unit generates a first route and a second route. The first route is a parking route to a temporary target position that is obtained by laterally moving the target position toward inside of the parking route in a turning direction. The second route is a parking route to the target position from a designated position in the middle of the first route. The automatic steering unit automatically operates the steering device to cause the subject vehicle to follow the first route until the subject vehicle reaches the designated position and to follow the second route from the designated position until the subject vehicle reaches the target position.

4 Claims, 6 Drawing Sheets

VEHICLE CONTROLLER

CROSS-REFERENCE TO RELATED APPLICATION

The present disclosure claims priority under 35 U.S.C. § 119 to Japanese Patent Applications No. 2018-059684, filed on Mar. 27, 2018. The contents of this application are incorporated herein by reference in their entirety.

FIELD

The present disclosure relates to a vehicle controller, and in particular to a vehicle controller that assists parking of a vehicle instead of a driver.

BACKGROUND

JP 2004-352110 A discloses a technology relating to a travel assisting device for vehicles that determines a travelling locus to a target position and assists a vehicle in travelling to follow the travelling locus. In this technology, a turning radius that is larger than a minimum turning radius unique for the vehicle is used to set the travelling locus to the target position at an initial stage, and the travelling locus can be thereafter reset. As a result, flexibility in resetting of the travelling locus is increased, which makes it possible to surely guide the vehicle to the target position.

SUMMARY

In the technology disclosed in JP 2004-352110 A, the travelling locus in which the turning radius includes a margin is set on an assumption that the position of the subject vehicle or the target position is deviated. Accordingly, in the technology disclosed in JP 2004-352110 A, steering performance of the subject vehicle is not utilized at a maximum, and it is difficult to park the vehicle in a narrow space.

The present disclosure is made in consideration of the above-described issues, and is directed to a vehicle controller that optimizes a parking route to allow for smooth parking when the vehicle controller automatically operates a steering device to park the subject vehicle at a target position.

To solve the above-described issues, a first aspect of the present disclosure is directed to a vehicle controller for automatically operating a steering device to park a subject vehicle to a target position. The vehicle controller includes a processor to execute a program, and a memory to store the program, when executed by the processor, performs processes. The processes include recognizing the target position, generating a parking route to the target position, and automatically operating the steering device to cause the subject vehicle to follow the parking route. The generating process is configured to generate a first route and a second route. The first route is a parking route to a temporary target position that is obtained by laterally moving the target position toward inside of the parking route in a turning direction, and the second route is a parking route to the target position from a designated position in the middle of the first route. Further, the operating process is configured to automatically operate the steering device to cause the subject vehicle to follow the first route until the subject vehicle reaches the designated position and to follow the second route from the designated position until the subject vehicle reaches the target position.

A second aspect of the present disclosure further includes the following characteristics in the first aspect.

The temporary target position is a position separated from an obstacle by a predetermined distance or more.

A third aspect of the present disclosure further includes the following characteristics in the first aspect.

The recognizing process is configured to update the target position while the subject vehicle follows the first route. In addition, the parking route generation unit is configured to generate the second route by use of the updated target position.

A fourth aspect of the present disclosure further includes the following characteristics in the third aspect.

The generating process is configured to set, as the designated position, a position of the subject vehicle at a time when the target position is updated.

Correction of the parking route inward in the turning direction is lower in flexibility than correction outward in the turning direction because of the characteristics of the vehicles. According to the first aspect, the steering device is automatically operated such that the subject vehicle follows the first route until reaching the designated position and then follows the second route from the designated position until reaching the target position. As a result, the subject vehicle follows the parking route at the inside of the target position in the turning direction until reaching the designated position. Therefore, the parking route is easily corrected even if the target position or the position of the subject vehicle is deviated. Accordingly, the parking route can be optimized, which allows for smooth parking assistance.

According to the second aspect, the temporary target position is set to the position separated from the obstacle by the predetermined distance or more. This makes it possible to prevent the subject vehicle from interfering with the obstacle.

According to the third aspect, the target position is updated while the subject vehicle follows the first route. As a result, the second route is generated by use of the more precise target position, which makes it possible to precisely park the subject vehicle at the target position.

According to the fourth aspect, the position of the subject vehicle at a time when the target position is updated is set as the designated position. As a result, the target position can be precisely grasped from the designated position, which makes it possible to generate the second route by use of the more precise target position.

DESCRIPTION OF EMBODIMENT

An embodiment of the present disclosure is described below with reference to drawings. Even when the number, quantity, amount, range, or other numerical attribute of an element is mentioned in the following embodiment, the disclosure is not limited to the mentioned numerical attribute unless it is expressly stated or theoretically defined. In addition, structures, steps, and the like described in conjunction with the embodiment are not necessarily essential to the disclosure unless expressly stated or theoretically defined.

Embodiment

1. Summary of Parking Assisting Control by Vehicle Controller

A vehicle controller is mounted on a vehicle, and executes parking assisting control that assists parking instead of a driver. In the following description, a vehicle mounted with the vehicle controller is referred to as "subject vehicle", a parking position targeted by the subject vehicle is referred to as "target position", and a route from a start position where parking is started to the target position is referred to as "parking route".

Figure 1:
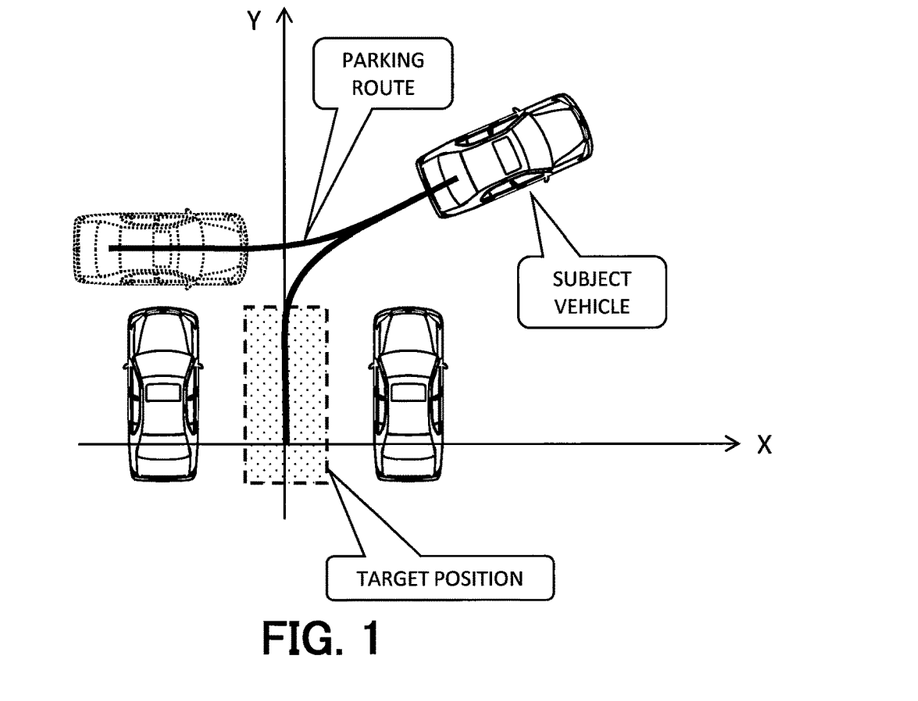
FIG. 1 is a conceptual diagram to explain parking assisting control by an existing vehicle controller.

FIG. 1 is a conceptual diagram to explain parking assisting control by an existing vehicle controller. In FIG. 1, a center position of a rear wheel axle in a case where the subject vehicle is parked at the target position is regarded as an origin of coordinates, a traveling direction of the subject vehicle parked at the target position is defined as +Y direction, and a right direction is defined as +X direction. The definition of the coordinate system is also applied to the other figures described later. In the parking assisting control, the vehicle controller automatically operates a steering device instead of a driver to park the subject vehicle at the target position. At this time, the vehicle controller first recognizes obstacles such as other vehicles based on surroundings information around the subject vehicle acquired from a camera, a sonar, etc., to recognize a target position available for parking. Next, the vehicle controller generates the parking route from the start position where parking is started to the target position. Further, the vehicle controller automatically operates the steering device so as to cause the subject vehicle to follow the parking route.

The inventors of the present application recognize the following issues in the above-described existing parking assisting control. There is difficulty in correction of the parking route inward in the turning direction because of the characteristics of the vehicles. Therefore, in a case where the actual parking route protrudes outward in the turning direction, it may be difficult for the above-described existing parking assisting control to guide the subject vehicle to the target position. Further, for example, in a case where the target position is updated to a position inside in the turning direction while the vehicle follows the parking route, it may be difficult for the above-described existing parking assisting control to guide the subject vehicle to the updated target position.

Figure 2:
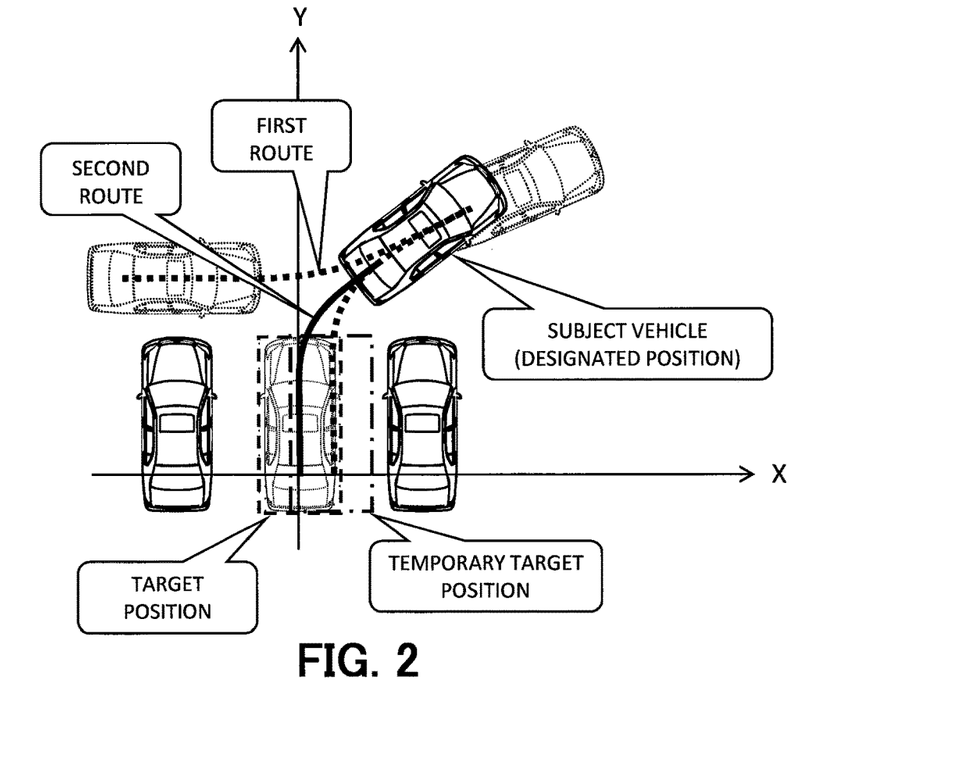
FIG. 2 is a conceptual diagram to explain parking assisting control by a vehicle controller according to an embodiment.

Therefore, in the vehicle controller according to the embodiment, the above-described issues are solved by the following parking assisting control. FIG. 2 is a conceptual diagram to explain the parking assisting control by the vehicle controller according to the embodiment. As illustrated in FIG. 2, the vehicle controller according to the present embodiment recognizes a temporary target position after recognizing the target position. The temporary target position is obtained by laterally moving the target position inward in the turning direction (in +X direction in FIG. 2) of the subject vehicle by a predetermined amount in a range not interfering with obstacles (other vehicles in FIG. 2).

Next, the vehicle controller generates a parking route to guide the subject vehicle from the start position to the temporary target position. In the following, the parking route is referred to as "first route". The vehicle controller then generates a parking route to guide the subject vehicle from a predetermined designated position in the middle of the first route to the target position. In the following, the parking route is referred to as "second route". The designated position is a position that is located in the first route and enables the subject vehicle to be steered to the target position without interfering with the obstacles. The designated position is desirably close to the target position as much as possible, and the target position is desirably updated based on the latest surroundings information obtained at that position.

The vehicle controller automatically operates the steering device such that the subject vehicle follows the first route from the start position to the designated position. When the subject vehicle reaches the designated position, the vehicle controller automatically operates the steering device such that the subject vehicle follows the second route from the designated position to the target position. The parking route on which the subject vehicle follows is changed, by such parking assisting control, to the second route outside the first route in the turning direction in the middle of the first route.

As described above, the vehicle controller according to the present embodiment prevents the parking route from being changed inward in the turning direction while the subject vehicle follows the parking route. As a result, steering correction inward in the turning direction low in turning flexibility is prevented, which makes it possible to perform smooth and precise parking assistance.

2. Configuration Example of Vehicle Controller

Figure 3:
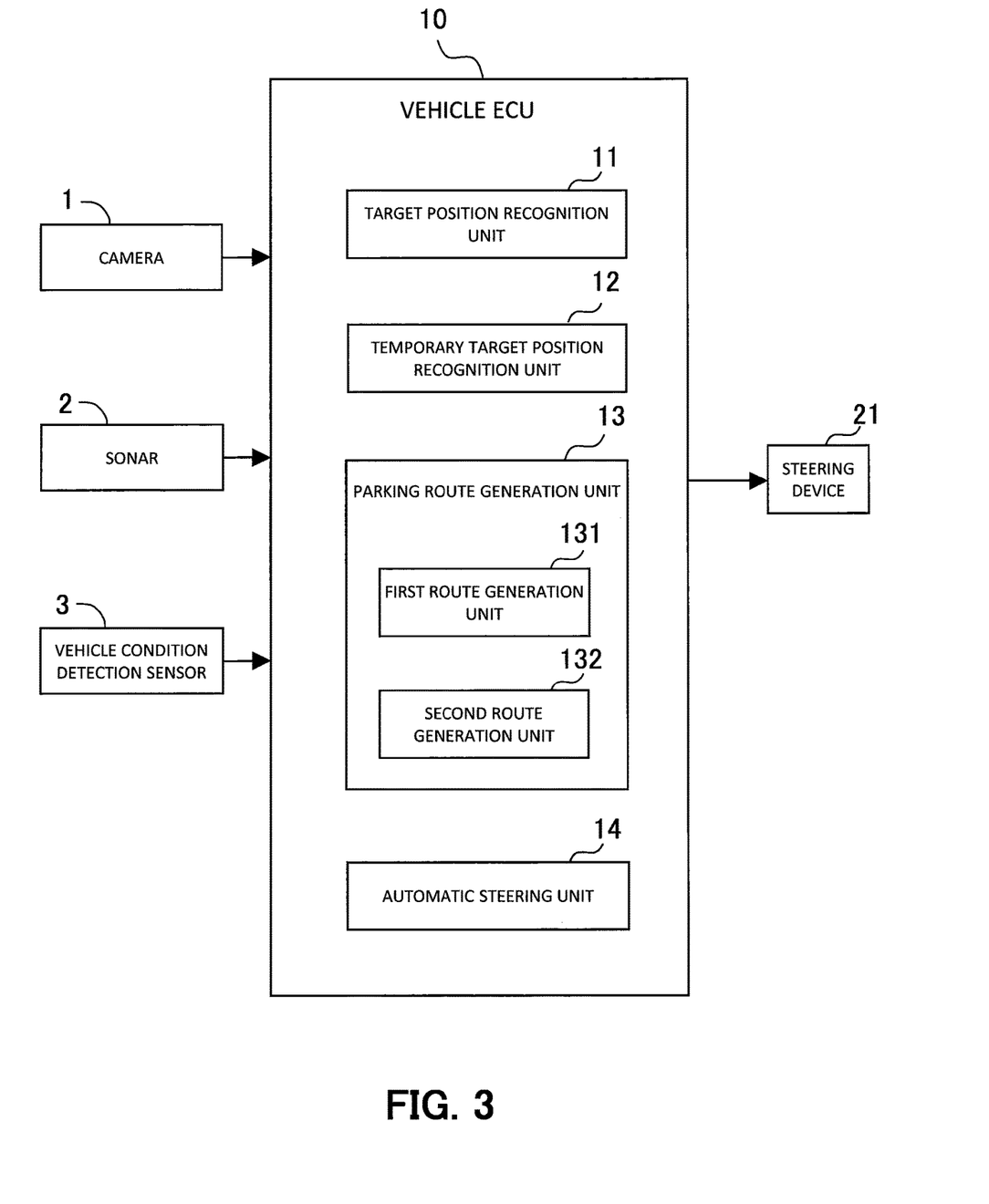
FIG. 3 is a diagram illustrating a schematic configuration of the vehicle controller according to the embodiment.

Next, a configuration example of the vehicle controller that executes the above-described parking assisting control is described. FIG. 3 is a diagram illustrating a schematic configuration of the vehicle controller according to the embodiment. The vehicle controller illustrated in FIG. 3 is mounted on a vehicle, and executes the parking assisting control to automatically perform steering to park the subject vehicle to the target position.

As illustrated in FIG. 3, the vehicle controller includes a vehicle ECU (electronic control unit) 10 that is mounted on the subject vehicle. The vehicle controller further includes a camera 1, a sonar 2, and a vehicle condition detection sensor 3 that are connected to input side of the vehicle ECU 10. The vehicle controller further includes a steering device 21 connected to output side of the vehicle ECU 10.

The camera 1 functions as information acquisition means that acquires the surroundings information around the subject vehicle. Examples of the camera 1 include a front camera that picks up an image in front of the subject vehicle, and a right rear camera and a left rear camera that respectively pick up images right and left rear sides of the subject vehicle. The images picked up by the camera 1 are transmitted as image data to the vehicle ECU 10 at any time, and the vehicle ECU 10 performs image processing on the image data. The surroundings information acquired by the camera 1 is, for example, positional information of obstacles including electric poles, buildings, persons, other vehicles, etc. and road information such as white line information.

The sonar 2 functions as information acquisition means that acquires the surroundings information around the subject vehicle by use of, for example, ultrasonic waves. The sonar 2 emits ultrasonic waves toward front side and rear side of the subject vehicle, and receives reflected waves thereof to acquire the surroundings information around the subject vehicle. The surroundings information acquired by the sonar 2 is, for example, presence/absence information of an obstacle, and a distance, an angle, etc. to the obstacle. The information detected by the sonar 2 is transmitted to the vehicle ECU 10 at any time.

The vehicle condition detection sensor 3 detects the position, the direction, and the traveling condition of the subject vehicle. Examples of the vehicle condition detection sensor 3 include a wheel speed sensor provided in each wheel, a vehicle speed sensor, and an acceleration sensor. The information detected by the vehicle condition detection sensor 3 is transmitted to the vehicle ECU 10.

The steering device 21 consists of a steering and a steering actuator, and automatically controls a steering angle irrespective of steering operation by the driver. The steering is a common steering device that changes a direction of wheels in response to the steering operation by the driver. The steering actuator changes the direction of the wheels through automatic steering, based on an instruction from the vehicle ECU 10, separately from the steering operation by the driver.

3. Description of Functions of Vehicle ECU

Figure 4:
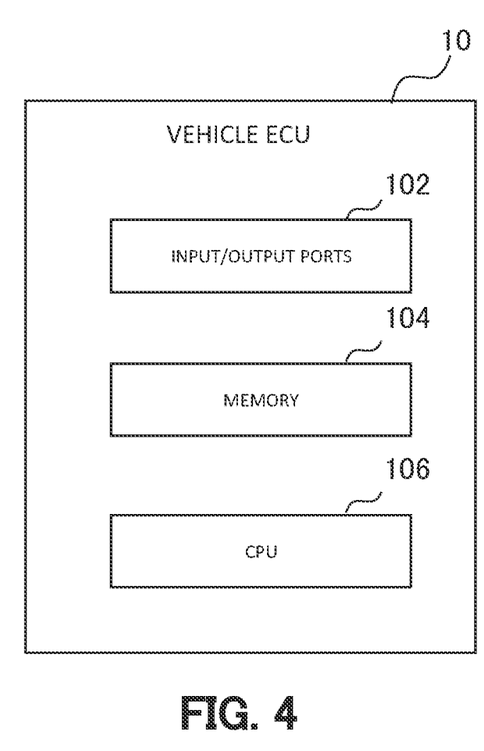
FIG. 4 is a diagram illustrating a schematic configuration of the vehicle ECU.

The vehicle ECU 10 is a computer including a CPU (Processor) that executes various kinds of calculation processing, a ROM (Read Only Memory) in which programs and data necessary for control of the CPU are stored, a RAM (Random Access Memory) in which results of the calculation by the CPU are temporarily stored, input/output ports to input/output signals with outside, and the like. FIG. 4 is a diagram illustrating a schematic configuration of the vehicle ECU. A processing circuit of the vehicle ECU 10 includes at least one input/output port 102, at least one memory 104, and at least one CPU (processor) 106. The input/output port 102 is provided to capture sensor signals from various sensors mounted in the subject vehicle, and to output operation signals to actuators provided in the vehicle. The sensors from which the vehicle ECU 10 captures signals include various sensors that are necessary to control the vehicle, such as the camera 1, the sonar 2, the vehicle condition detection sensor 3, and the like. The actuators to which the vehicle ECU 10 sends the operation signals include various actuators such as the steering device 21 described above. Various control programs for controlling the internal combustion engine, maps and the like are stored in the memory 104. The CPU (processor) 106 reads out, from the memory, and executes control programs and the like, and generates operation signals based on captured sensor signals.

The vehicle ECU 10 according to the embodiment executes the parking assisting control to park the subject vehicle to the target position. The vehicle ECU 10 includes a target position recognition unit 11, a temporary target position recognition unit 12, a parking route generation unit 13, and an automatic steering unit 14 as functional blocks to realize the above-described parking assisting control or control associated therewith.

Figure 5:
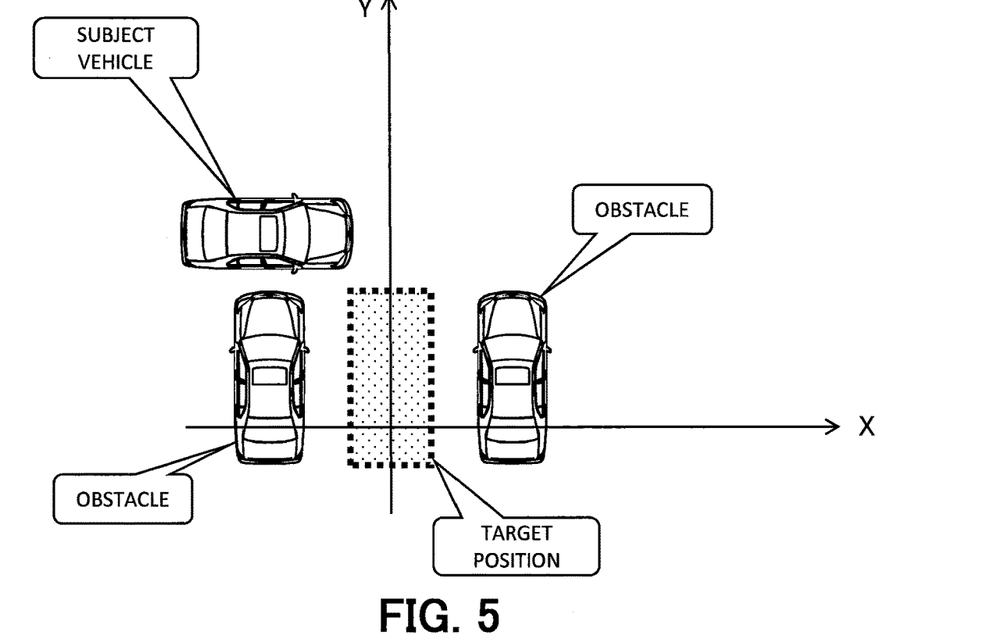
FIG. 5 is a diagram to explain operation to recognize a target position.

The target position recognition unit 11 is a functional block to recognize the target position where the subject vehicle is to be parked, based on the surroundings information transmitted from the camera 1 and the sonar 2. FIG. 5 is a diagram to explain operation to recognize the target position. In the example illustrated in FIG. 5, the target position recognition unit 11 recognizes, as the target position, an intermediate position sandwiched between two other vehicles as the obstacles. Note that the target position recognition unit 11 preferably updates the target position while the subject vehicle follows the parking route. The specific update operation executed by the target position recognition unit 11 is described in detail with reference to a flowchart described later. A result of the recognition by the target position recognition unit 11 is transmitted to the temporary target position recognition unit 12 and the parking route generation unit 13.

Figure 6:
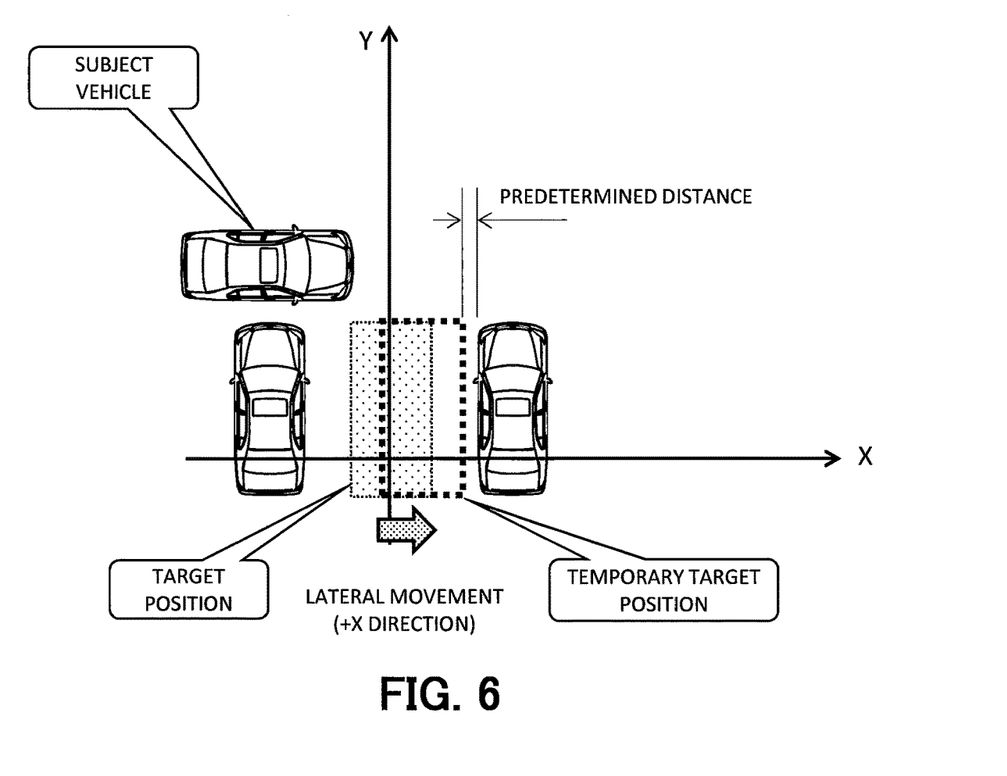
FIG. 6 is a diagram to explain operation to recognize a temporary target position.

The temporary target position recognition unit 12 is a functional block to recognize the temporary target position by use of the surroundings information transmitted from the camera 1 and the sonar 2 and the recognition result transmitted from the target position recognition unit 11. FIG. 6 is a diagram to explain operation to recognize the temporary target position. As illustrated in FIG. 6, the temporary target position recognition unit 12 recognizes, as the temporary target position, a position obtained by laterally moving the target position so as to be separated by a predetermined distance or more from the obstacle that is located at the inside of the subject vehicle in the turning direction. A result of the recognition by the temporary target position recognition unit 12 is transmitted to the parking route generation unit 13.

Figure 7:
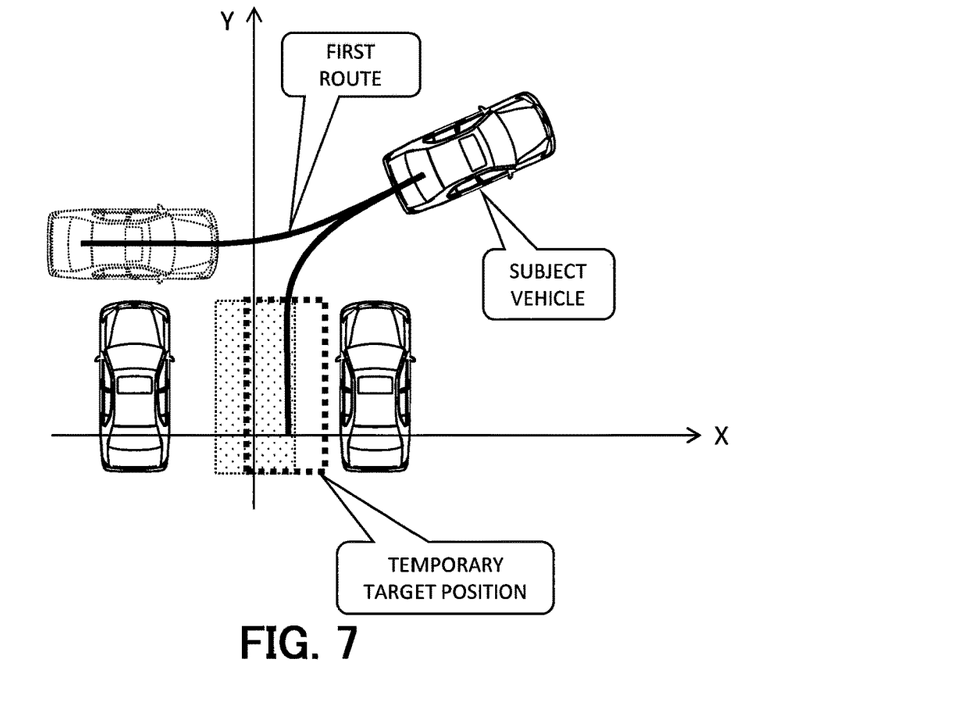
FIG. 7 is a diagram to explain operation to generate a first route.

The parking route generation unit 13 is a functional block to generate the parking route to park the subject vehicle at the target position without interfering with the obstacles, based on the surroundings information transmitted from the camera 1 and the sonar 2 and the vehicle condition transmitted from the vehicle condition detection sensor 3. The parking route generation unit 13 specifically includes a first route generation unit 131 and a second route generation unit 132. The first route generation unit 131 generates the first route that is a parking route to park the subject vehicle from the current position to the temporary target position, by use of the recognition result transmitted from the temporary target position recognition unit 12. FIG. 7 is a diagram to explain operation to generate the first route. FIG. 7 illustrates the parking route on which the vehicle moves left forward once and then moves right rearward. The first route preferably includes a parking route that causes the subject vehicle to turn at a minimum turning radius.

Figure 8:
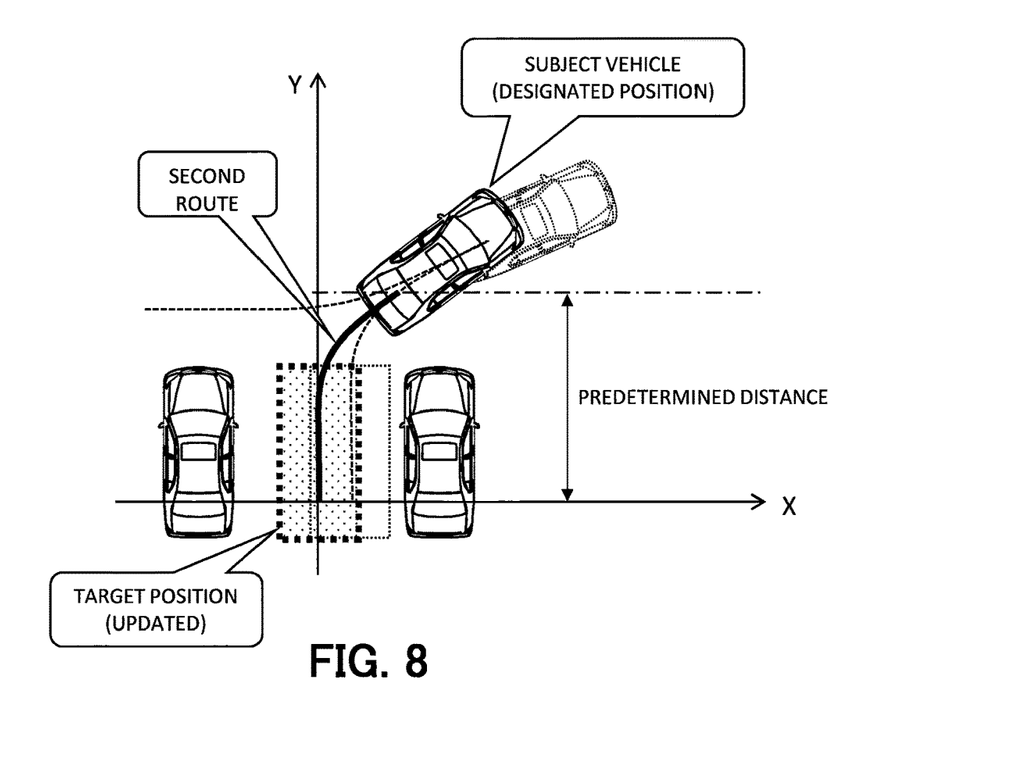
FIG. 8 is a diagram to explain operation to generate a second route.

Further, the second route generation unit 132 generates the second route that is a corrected parking route to park the subject vehicle from the middle of the first route to the target position, by use of the recognition result transmitted from the target position recognition unit 11. FIG. 8 is a diagram to explain operation to generate the second route. FIG. 8 illustrates the parking route on which the vehicle moves rearward from a predetermined designated position in the first route to the target position. The predetermined designated position is a position that allows for generation of the achievable second route. In the example illustrated in FIG. 8, a position where a distance in the +Y direction from the coordinate origin to the center position of the rear wheel axle of the subject vehicle becomes a predetermined distance (e.g., 5000 mm to 6000 mm) or more is set as the designated position.

Note that the designated position is preferably a position allowing for recognition of the target position with high precision. In other words, the target position can be updated to a more precise position by use of the latest surroundings information obtained while the subject vehicle follows the first route. Therefore, the designated position is set to, for example, a position where the target position can be recognized with high precision in the update operation of the target position. This enables the second route generation unit 132 to generate the second route toward the precise target position.

The automatic steering unit 14 automatically operates the steering device 21 such that the subject vehicle follows the first route. Further, in a case where the subject vehicle reaches the designated position in the first route, the automatic steering unit 14 automatically operates the steering device 21 such that the subject vehicle follows the second route.

4. Specific Processing of Parking Assisting Control

Figure 9:
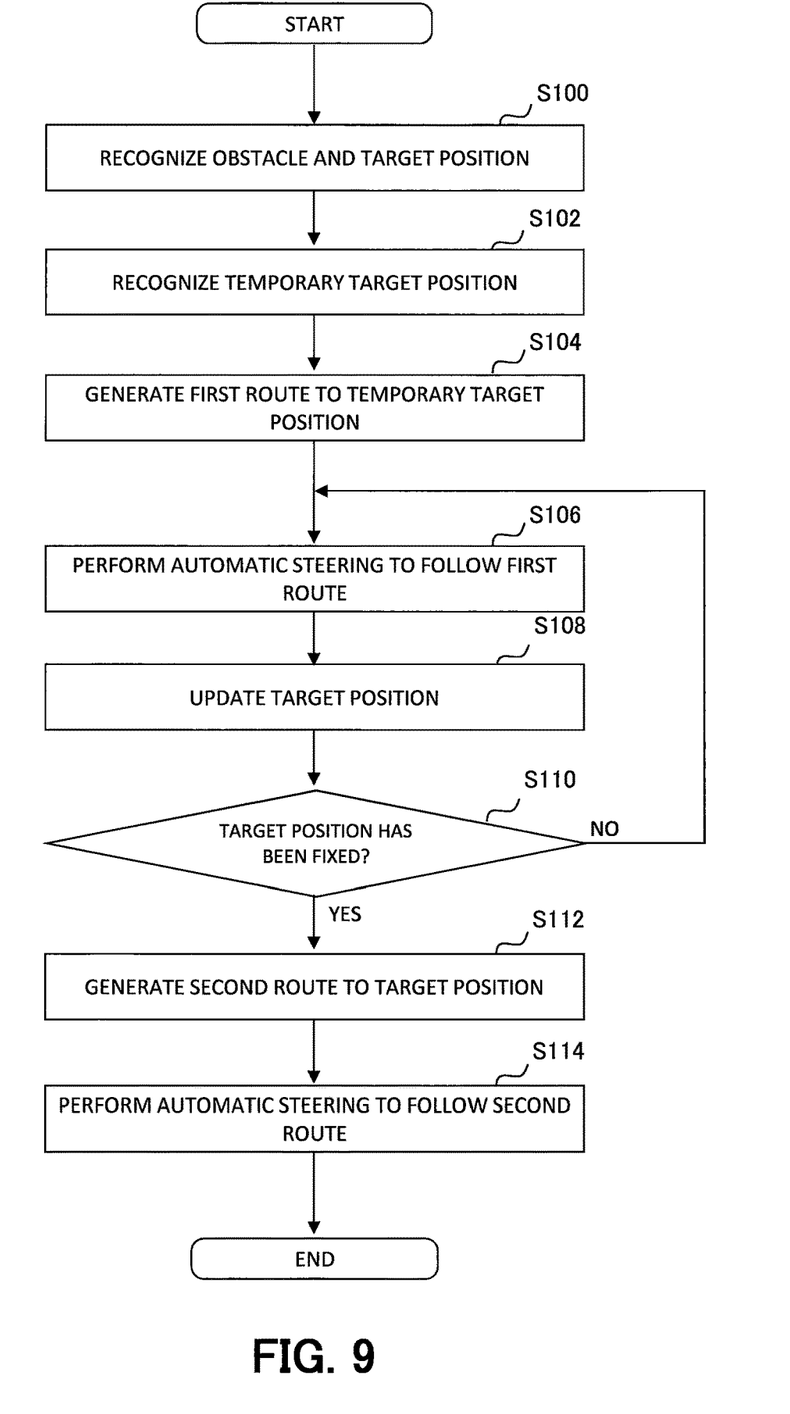
FIG. 9 is a flowchart illustrating a routine of the parking assisting control executed in the embodiment.

Next, the specific processing of the parking assisting control executed by the vehicle controller including the above-described configuration according to the embodiment is described with reference to a flowchart. FIG. 9 is a flowchart illustrating a routine of the parking assisting control executed in the present embodiment. The routine illustrated in FIG. 9 is executed by the vehicle ECU 10 in a case where a parking request is issued to the subject vehicle.

When the routine illustrated in FIG. 9 is started, the target position recognition unit 11 first recognizes the target position where the subject vehicle is to be parked, based on the surroundings information transmitted from the camera 1 and the sonar 2 (step S100). Next, the temporary target position recognition unit 12 recognizes the temporary target position by use of the surroundings information transmitted from the camera 1 and the sonar 2 and the recognition result transmitted from the target position recognition unit 11 (step S102). Next, the first route generation unit 131 of the parking route generation unit 13 generates the first route to park the subject vehicle from the current position to the temporary target position, by use of the recognition result transmitted from the temporary target position recognition unit 12 (step S104). Next, the automatic steering unit 14 automatically operates the steering device 21 such that the subject vehicle follows the first route (step S106).

Next, the target position recognition unit 11 performs the update operation to update the target position (step S108). More specifically, the target position recognition unit 11 acquires the surroundings information transmitted from the camera 1 and the sonar 2 while the subject vehicle follows the first route. Further, the target position recognition unit 11 updates the latest target position with the target position recognized based on the acquired latest surroundings information.

Next, the target position recognition unit 11 determines whether the target position has been fixed (step S110). At this time, the target position recognition unit 11 determines whether the precise target position has been recognized based on the latest surroundings information transmitted from the camera 1 and the sonar 2. For example, the target position recognition unit 11 can determine that the precise target position has been recognized in a case where the target position recognition unit 11 can recognize the whole of the white lines for parking on the road through the camera 1, or in a case where the target position recognition unit 11 can recognize the distance and the direction of the obstacle with high precision through the sonar 2.

In a case where the determination is not established as a result of the process in step S110, the processing proceeds to the process in step S106 again. Then, the automatic steering unit 14 controls the steering device 21 such that the subject vehicle follows the first route. In other words, in the routine illustrated in FIG. 9, the processes from step S106 to step S110 are repeatedly performed until the determination in step S110 is established.

In contrast, in a case where the determination is established as a result of the process in step S110, it is determined that the precise target position has been recognized. Therefore, the processing proceeds to next step, and the second route is generated (step S112). At this time, the second route generation unit 132 of the parking route generation unit 13 generates, as the second route, the parking route from the designated position to the target position by use of the current position of the subject vehicle when the determination in step S110 is established as the designated position.

Next, the automatic steering unit 14 automatically operates the steering device 21 such that the subject vehicle follows the second route (step S114). As a result, the subject vehicle is automatically steered to the target position through change of the parking route from the first route to the second route. Accordingly, the subject vehicle follows the route at the inside of the target position in the turning direction until reaching the designated position. Therefore, even if the target position or the position of the subject vehicle is deviated, it is possible to park the subject vehicle at the target position.

5. Modification of Vehicle Controller According to Present Embodiment

The vehicle controller according to the present embodiment can adopt a configuration modified in the following manner.

The update operation for the target position is not essential. In a case where the update operation for the target position is not performed, the processes in step S108 and step S110 after the process in step S106 are skipped in the routine illustrated in FIG. 9. In addition, in the process in next step S112, the second route can be generated by use of the target position recognized in step 100.

It is unnecessary to make the position of the subject vehicle when the target position is fixed coincident with the designated position. In other words, the position after further following the first route may be set as the designated position as long as the second route can be generated.

The parking assisting control may perform travelling assistance that automatically operates a driving device such as an engine and a braking device such as a brake, in addition to the automatic operation of the steering device 21 described above.

What is claimed is:

1. A vehicle controller for automatically operating a steering device to park a subject vehicle at a target position, the vehicle controller comprising:
   a processor to execute a program; and
   a memory to store the program which, when executed by the processor, performs processes of:
   recognizing the target position based on information obtained by a sensor of the subject vehicle,
   after recognizing the target position, generating a first route and a second route, the first route being a parking route to a temporary target position that is obtained by laterally shifting from the target position in only a lateral direction toward an inside of the parking route in a turning direction, and the second route being a parking route to the target position from a designated position in the middle of the first route, and automatically operating the steering device to cause the subject vehicle to follow the first route until the subject vehicle reaches the designated position in the middle of the first route and to follow the second route from the designated position until the subject vehicle reaches the target position.

2. The vehicle controller according to claim 1,
wherein the temporary target position is a position separated from an obstacle by a predetermined distance or more.

3. The vehicle controller according to claim 1,
wherein the recognizing process is configured to update the target position while the subject vehicle follows the first route, and the generating process is configured to generate the second route by use of the updated target position.

4. The vehicle controller according to claim 3,
wherein the operating process is configured to set, as the designated position, a position of the subject vehicle at a time when the target position is updated.

* * * * *